United States Patent
Su et al.

(10) Patent No.: US 7,991,425 B2
(45) Date of Patent: Aug. 2, 2011

(54) MOBILE TERMINAL DEVICE AND ROAMING METHOD THEREOF

(75) Inventors: Chi-Chung Su, Taipei Hsien (TW); Min-Chia Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 527 days.

(21) Appl. No.: 12/247,990

(22) Filed: Oct. 8, 2008

(65) Prior Publication Data

US 2009/0312014 A1    Dec. 17, 2009

(30) Foreign Application Priority Data

Jun. 16, 2008 (CN) .......................... 2008 1 0302155

(51) Int. Cl.
*H04M 1/00* (2006.01)

(52) U.S. Cl. ............... 455/550.1; 455/552.1; 455/553.1; 370/331; 370/328; 370/338

(58) Field of Classification Search .............. 455/432.1, 455/436, 452.2, 453, 552.1, 550.1, 437–444; 370/328–338

See application file for complete search history.

(56) References Cited

U.S. PATENT DOCUMENTS

| | | | | |
|---|---|---|---|---|
| 5,991,287 A | * | 11/1999 | Diepstraten et al. | 370/338 |
| 7,120,448 B2 | * | 10/2006 | Brouwer | 455/453 |
| 2002/0150063 A1 | * | 10/2002 | Tran | 370/332 |

* cited by examiner

*Primary Examiner* — Kamran Afshar
*Assistant Examiner* — Kenneth Corbin
(74) *Attorney, Agent, or Firm* — Frank R. Niranjan

(57) ABSTRACT

A mobile terminal device detects current communication environment status of the device and calculates a value of a radio quality index (RQI), and adjusts the roaming threshold according to the value of the RQI. The device further calculates a value of a user movement index (UMI) and adjusts the frequency of the device for scanning object access points. After determining the object access point that has satisfied a roaming threshold, the device ends the communication between the device and the current access point, and establishes a communication between the device and the object access point.

20 Claims, 3 Drawing Sheets

MOBILE TERMINAL DEVICE AND ROAMING METHOD THEREOF

BACKGROUND

1. Field of the Invention

The present invention relates to mobile terminal devices, and particularly to a mobile terminal device and a roaming method thereof based on communication environment parameters of a number of access points.

2. Description of Related Art

A wireless network generally includes a number of access points (APs). An access point provides a point of connection for wireless communication devices, such as a mobile terminal device where the mobile terminal device may roam from one AP to another AP. A typical roaming situation entails a user at a mobile terminal device moving away from an access point to the mobile terminal device that is connected for providing a wireless service. As the mobile terminal moves away from the access point, the mobile terminal device scans for an object access point, and associates itself with the object access point. Roaming introduces many undesirable effects in user connectivity and delivery of services because during this process, connectivity is momentarily lost, which causes disruption of a wireless service.

However, because the typical mobile terminal device scans the object access point by invariable frequency during roaming the mobile terminal device consumes more energy.

What is needed, is a mobile terminal device having a more energy efficient roaming capability.

DETAILED DESCRIPTION

Figure 1:
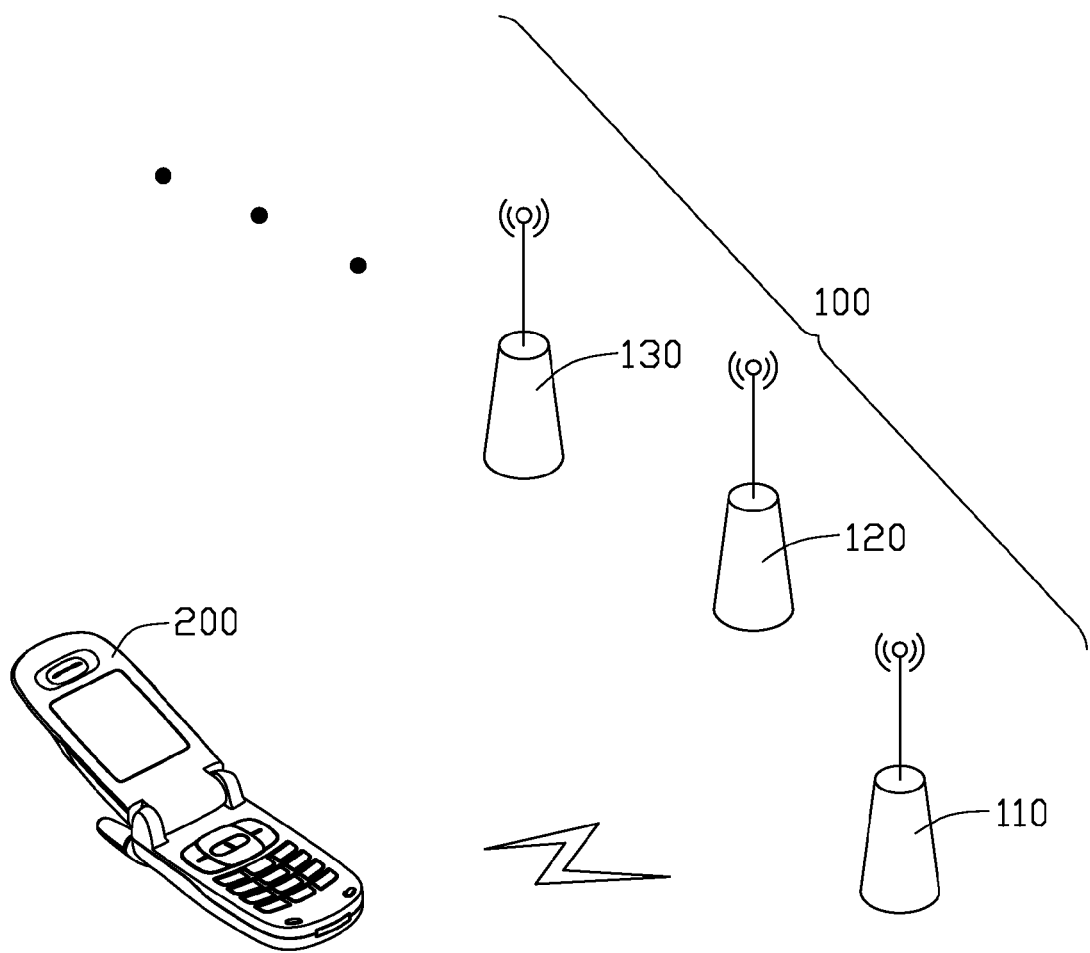
FIG. 1 is a schematic diagram illustrating a mobile terminal device in accordance with an exemplary embodiment of the present invention communicating wirelessly with an access point region.

Referring to FIG. 1, a mobile terminal device 200 in accordance with an exemplary embodiment of the present invention is illustrated communicating wirelessly with an access point region 100. The access point region 100 includes a plurality of access points (APs), such as access points 110, 120, 130, etc. In one embodiment, the mobile terminal device 200 and the AP region 100 may communicate with one another in compliance with the 802.11x serial standards of the Institute of Electrical and Electronics Engineers (IEEE). The mobile terminal device 200 and the AP region 100 may comply with other mobile communication standards depending on the embodiment. The mobile terminal device 200 may be mobile phone, a personal digital assistant (PDA), or other mobile electronic devices with a communication function depending on the embodiment.

In the illustrated embodiment, the mobile terminal device 200 communicates with the access point 110 to connect to the Internet (not shown), along with other APs located around the mobile terminal device 200, such as the access point 120, 130, etc. If the service quality of the AP 110 cannot maintain normal communication with the mobile terminal device 200 in a wireless local area network (WLAN), the mobile terminal device 200 attempts to roam away from the AP 110 to another AP, such as the AP 120 in order to maintain better service quality between the AP 120 and the mobile terminal device 200.

Figure 2:
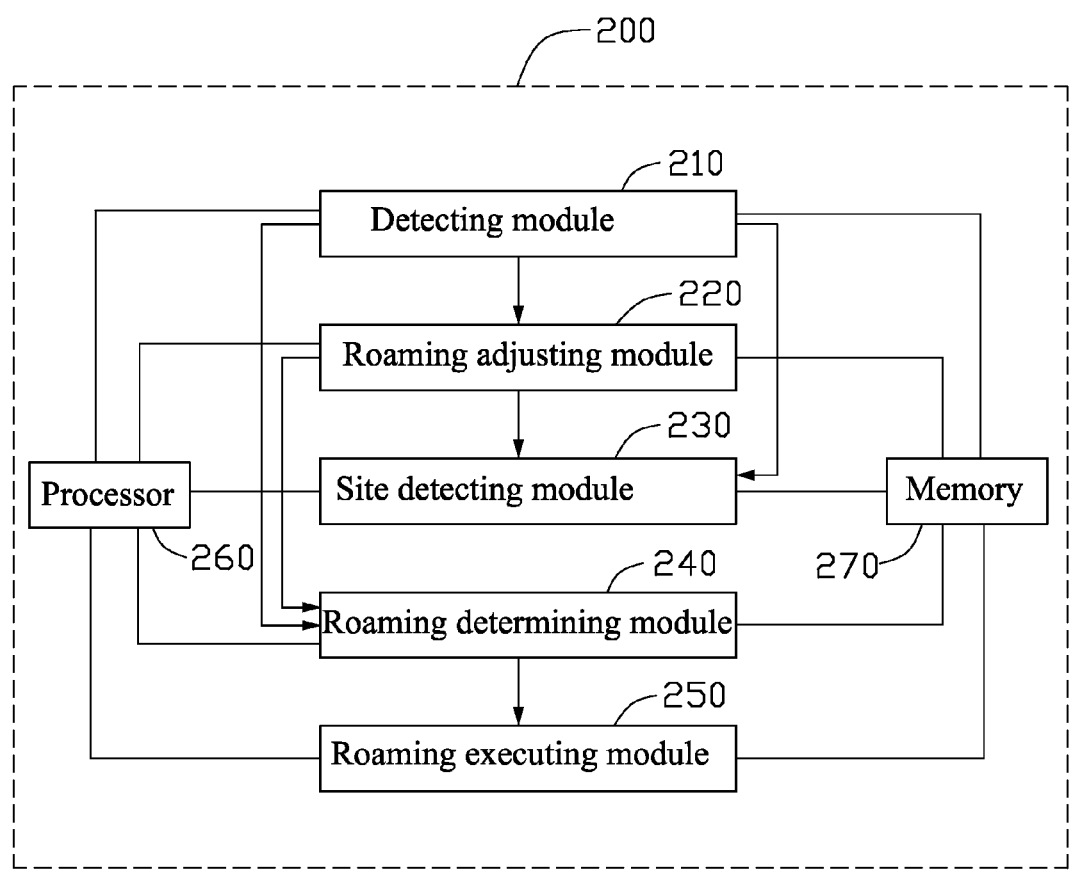
FIG. 2 is a block diagram of the mobile terminal device of FIG. 1.

Referring to FIG. 2, the mobile terminal device 200 includes a detecting module 210, a roaming adjusting module 220, a site detecting module 230, a roaming determining module 240, and a roaming executing module 250, all of which may be implemented by software and/or electronic circuits, depending on the embodiment. A processor 260 may be used to execute various operations for the modules 210, 230, 240, 250 and other operations of the mobile terminal device 200.

The detecting module 210 is configured for detecting communication environment status of the mobile terminal device 200 in a predetermined detection period. The communication environment status includes current communication environment parameters of the access point region 100, and roaming frequency and packet retransmission rate of the mobile terminal device 200. The current communication environment parameters of the access point region 100 includes a quality of service basic service set (QBSS) and a received signal strength indication (RSSI) of the AP region 100. These data are collected with periodical scan of the AP region 100 with the scan frequency controlled by site detecting module 230.

The QBSS of the AP region 100 represents a current channel utilization rate and a current loading of the AP region 100. It may be understood that the bigger a value of the QBSS is, the greater the current channel utilization rates of a corresponding one of the AP region 100 and the current loading of the AP region 100 will be. The RSSI of the AP region 100 is the average of the RSSI of each AP of the AP region 100 in the predetermined detection period, and represents a stability of each AP of the AP region 100. The bigger the value of the RSSI is, the better the stability of a corresponding one AP of the AP region 100 will be.

The roaming frequency of the mobile terminal device 200 is the roaming amount of the mobile terminal device 200 in a system operation period, which is detected by the detecting module 210 in the predetermined detection period and indicates the communication stability between the mobile terminal device 200 and the AP region 100. The communication stability between the mobile terminal device 200 and the AP region 100 is increasingly worsened as the roaming frequency increases. The packet retransmission rate of the mobile terminal device 200 is the packet retransmission amount in an audio operation period, which indicates the communication stability between the mobile terminal device 200 and the current AP 110. The communication stability between the mobile terminal device 200 and the current AP 110 is increasingly worsened as the packet retransmission rate increases In one embodiment, the predetermined detection period, the system operation period, and the audio operation period can be set to be the same or different from each other.

The detecting module 210 is further configured for sending current communication environment parameters of the access point region 100, and roaming frequency and packet retransmission rate of the mobile terminal device 200 to the roaming adjusting module 220, the site detecting module 230, and the roaming determining module 240.

The roaming adjusting module 220 is configured for calculating a value of a radio quality index (RQI) according to the current communication environment parameters of the access point region 100, and the roaming frequency and the packet retransmission rate of the mobile terminal device 200. The roaming adjusting module 220 adjusts roaming threshold of the current AP 110 according to the value of the RQI. The RQI is calculated according to following formula:

$$RQI = Max\_RQI - iRQI, \quad (1)$$

$$\begin{aligned}iRQI = &(((Avg\_QBSS \div Max\_QBSS)*Max\_RQI)*0.5) + \\ &(((Roam\_Freq \div Max\_Freq)*Max\_RQI)*0.2) + \\ &(((Retx\_Rate \div Max\_Retx\_Rate)*Max\_RQI) \\ &*0.2) + \\ &(((Avg\_RSSI\_Variance \div Max\_RSSI\_Variance) \\ &*Max\_RQI)*0.1) \quad (2)\end{aligned}$$

where,

Max_RQI is the maximum value of the RQI;

Max_QBSS is the maximum value of the QBSS;

Avg_QBSS is the average value of the QBSS;

Max_Freq is the maximum roaming amount of the mobile terminal device 200;

Roam_Freq is current roaming amount of the mobile terminal device 200;

Max_Retx_Rate is the maximum packet retransmission rate of the mobile terminal device 200;

Retx_Rate is the current packet retransmission rate of the mobile terminal device 200;

Max_RSSI_Variance is the maximum RSSI variance of the access point region 100;

Avg_RSSI_Variance is the average RSSI variance of the access point region 100.

In one exemplary embodiment, the predetermined value of the Max_RQI may be set to 100, the Max_QBSS may be set to 100, the Avg-QBSS is the average value of the QBSS of the AP region 100. The Max_Freq is a maximum roaming amount allowed within the mobile terminal device 200 in the system operation period. The Roam_Freq is the current roaming amount of the mobile terminal device 200 in the system operation period detected by the detecting module 210 in the predetermined detection period. The Max_Retx_Rate is the maximum packet retransmission amount of the mobile terminal device 200 in the audio operation period, and the Retx_Rate is a current packet retransmission amount of mobile terminal device 200 in the audio operation period detected by the detecting module 210 in the predetermined detection period. The Max_RSSI_Variance is the maximum RSSI variance of the AP region 100 in the predetermined detection period, and the Avg_RSSI_Variance is the average RSSI variance of the AP region 100 detected by the detecting module 210 in the predetermined detection period.

According to the RQI, the communication environment status can be classified into three statuses: a normal status, a high traffic status, and an interference status. If the value of the RQI is not less than a first threshold, the communication environment status of the current AP 110 is in the normal status, and the communication environment status is normal. If the value of the RQI is between a second threshold and the first threshold, the communication environment status of the current AP 110 is in the high traffic status, and the communication environment status is in a bad state. If the value of the RQI is less than the second threshold, the service quality of the current AP 110 is in the interference status, and the communication environment status is at its worst state, where the first threshold is bigger than the second threshold. In this embodiment, the first threshold may be 70 and the second threshold may be 40. In alternative embodiments, the communication environment status can be measured according to different values of the RQI, and different thresholds can be set, but are not limited, to 40 and 70.

The roaming adjusting module 220 regulates the roaming threshold of the current AP 110 according to the communication environment status. The worse the communication environment status is, the higher the roaming threshold will be. In this embodiment, the roaming threshold includes differences of the RSSI and the QBSS respectively between the object AP and the current AP.

The site detecting module 230 is configured for calculating a value of a user movement index (UMI) according to the current communication environment parameters of the access point region 100, and the beacon loss rate and the packet loss rate of the mobile terminal device 200. In one embodiment, the UMI may be calculated according to the following formula:

$$\begin{aligned}UMI = &(((Avg\_RSSI \div Max\_RSSI)*Max\_UMI)*0.35) + \\ &(((1-RSSI\_Variance \div Max\_RSSI\_Variance) \\ &*Max\_UMI)*0.3) + (((1- \\ &Beacon\_Loss\_Count \div Max\_Beacon\_Loss) \\ &*Max\_UMI)*0.2) + (((1- \\ &Packet\_Loss\_Rate \div Max\_Packet\_Loss) \\ &*Max\_UMI)*0.15) \quad (3)\end{aligned}$$

where,

Avg_RSSI_Variance is the average RSSI of the access point region 100.

Max_RSSI is the maximum value of the RSSI;

Max_UMI is the maximum value of the UMI;

RSSI_Variance is the RSSI variance of the access point region 100;

Max_RSSI_Variance is the maximum RSSI variance of the access point region 100;

Beacon_Loss_Count is the beacon loss amount of the access point in period;

Max_Beacon_Loss is the maximum value of the beacon loss of the access point;

Packet_Loss_Rate is the current packet loss rate of the mobile terminal device 200;

Max_Packet_Loss_Rate is the maximum packet loss rate of the mobile terminal device 200.

The site detecting module 230 adjusts frequency of the mobile terminal device for scanning object AP according to the value of the UMI and the value of the RQI.

According to the value of the UMI, user movement status can be classified into three statuses: a static status, a walk status, and a run status. If the user movement status is in the static status and the value of the RQI is in the normal status and the communication signal between the mobile terminal device 200 and the access point region 100 is stable, then the frequency of the mobile terminal device for scanning object AP can be lowered. If the value of the RQI is in the high traffic status or the interference status and the communication signal between the mobile terminal device 200 and the access point region 100 is not stable, the frequency of the mobile terminal device for scanning object AP should perform a more aggressive scan. If the user movement status is in the walk status, the communication signal between the mobile terminal device 200 and the access point region 100 slowly weakens, and the frequency of the mobile terminal device for scanning object access points can be set to a medium rate. If the user movement status is in the run status, the communication signal between the mobile terminal device 200 and the access point region 100 drops down to a very low value in a short time, or is lost, and the frequency of the mobile terminal device for scanning object access points can be set to a high rate, which scans the object access point quickly. The mobile terminal device 200 can save energy by adjusting the frequency of the mobile terminal device 200 for scanning object access points.

The roaming determining module 240 is configured for receiving the roaming threshold from the roaming adjusting module 220, and determining the object AP that has satisfied a roaming threshold. When the better object AP has been found, and the RSSI and QBSS difference between current AP and the object AP is greater than the calculated roaming threshold, the mobile terminal device 200 roams to the object AP.

The roaming determining module 240 is further configured for generating a roaming executing command and sending the roaming executing command to the roaming executing module 250 if the object AP has satisfied the roaming threshold. If the roaming determining module 240 determines that the object AP has not satisfied the roaming threshold, the roaming determining module 240 does not output a roaming executing command to the roaming executing module 250.

The roaming executing module 250 is configured for receiving the roaming executing command from the roaming determining module 240. If the object AP has satisfied the roaming threshold, the roaming determining module 240 generates a roaming executing command and sends the roaming executing command to the roaming executing module 250. Then, the roaming executing module 250 ends the communication between the mobile terminal device 200 and the current AP 110, and establishes a communication between the mobile terminal device 200 and the object AP. These collected data of the modules 210, 220, 230, 240, 250 and other data of the mobile terminal device 200 can be stored in a memory system 270.

If the roaming determining module 240 determines that there is no object AP that has satisfied the roaming threshold, the roaming executing module 250 does not output a roaming executing command to the roaming executing module 250, and the process ends.

Figure 3:
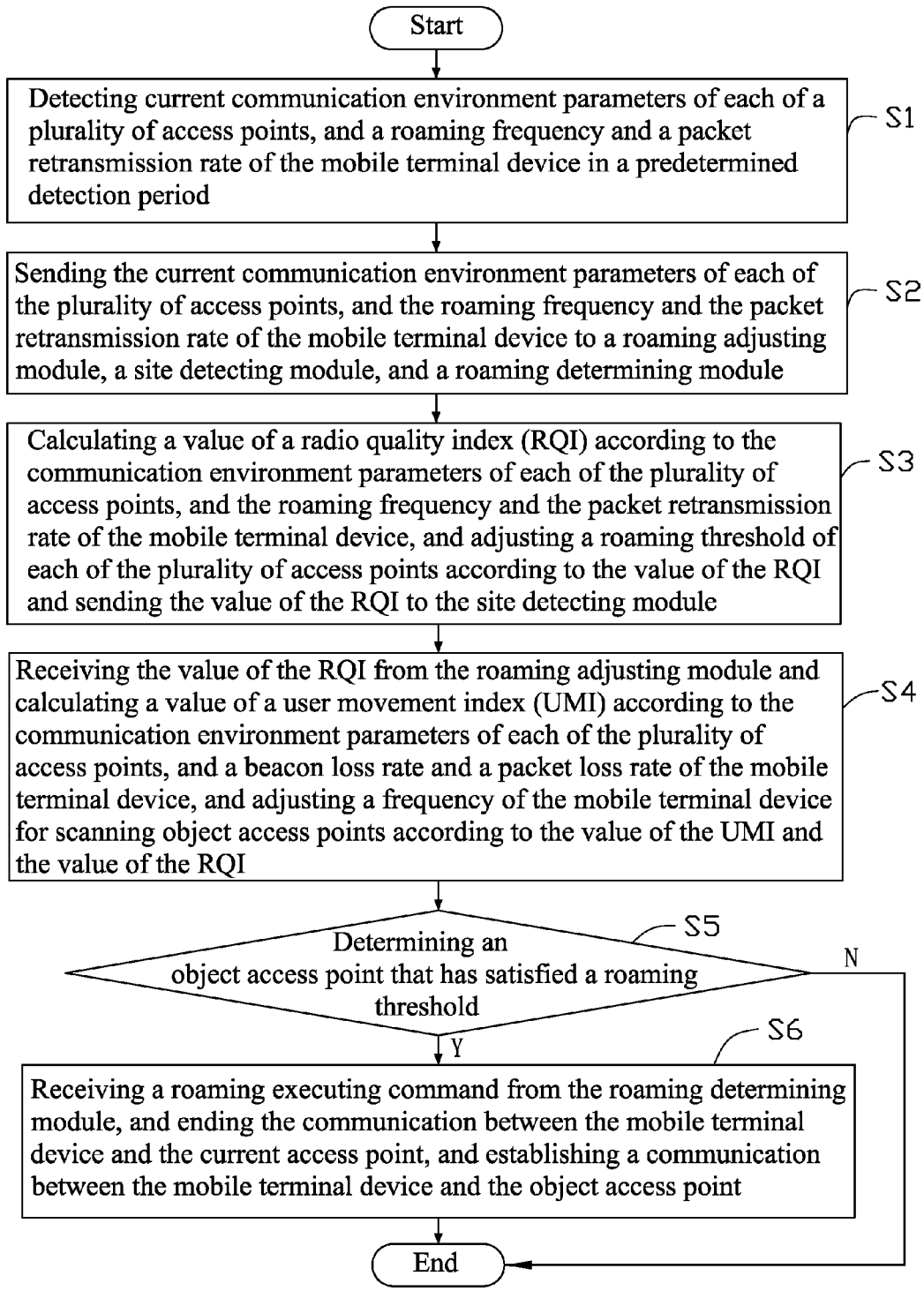
FIG. 3 is a flowchart of one embodiment of a roaming method for the mobile terminal device of FIG. 1.

Referring to FIG. 3, one embodiment of a roaming method for when the mobile terminal device 200 attempts to roam away from a current AP to an object AP for better service quality includes the following blocks:

In block S1, the detecting module 210 detects current communication environment parameters of the access point region 100, and roaming frequency and packet retransmission rate of the mobile terminal device 200 in a predetermined detection period.

In block S2, the detecting module 210 sends the current communication environment parameters, and roaming frequency and packet retransmission rate to the roaming adjusting module 220, the site detecting module 230, and the roaming determining module 240.

In block S3, the roaming adjusting module 220 calculates a value of a radio quality index (RQI) according to the communication environment parameters of the access points, and the roaming frequency and the packet retransmission rate of the mobile terminal device 200.

In block S4, the site detecting module 230 receives the RQI from the roaming adjusting module 220, and calculates a value of a user movement index (UMI) according to the communication environment parameters of the access points, and the beacon loss rate and the packet loss rate of the mobile terminal device 200, and adjusts frequency of the mobile terminal device 200 for scanning object AP according to the value of the UMI and the value of the RQI.

In block S5, the roaming determining module 240 receives the roaming threshold from the roaming adjusting module 220, and determining the object AP that has satisfied a roaming threshold.

In block S6, if the object AP has satisfied the roaming threshold, the roaming determining module 240 generates a roaming executing command and sends the roaming executing command to the roaming executing module 250. Then, the roaming executing module 250 ends the communication between the mobile terminal device 200 and the current AP 110, and establishes a communication between the mobile terminal device 200 and the object AP. If the roaming determining module 250 determines that there is no object AP that has satisfied the roaming threshold, the roaming determining module 250 does not act, and the process ends.

The mobile terminal device 200 can save energy by adjusting a frequency of the mobile terminal device 200 for scanning object access points.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others of ordinary skill in the art to utilize the invention and various embodiments and with various modifications as are suited to the particular use contemplated. Alternative embodiments will become apparent to those of ordinary skill in the art to which the present invention pertains without departing from its spirit and scope. Accordingly, the scope of the present invention is defined by the appended claims rather than the foregoing description and the exemplary embodiments described therein.

What is claimed is:

1. A mobile terminal device for roaming from a current access point (AP) to an object access point according to communication environment parameters of a plurality of access points, comprising: a detecting module configured for detecting current communication environment parameters of each of the plurality of access points, and a roaming frequency and a packet retransmission rate of the mobile terminal device in a predetermined detection period; a roaming adjusting module configured for calculating a value of a radio quality index (RQI) according to the communication environment parameters of each of the plurality of access points, and the roaming frequency and the packet retransmission rate of the mobile terminal device, and adjusting a roaming threshold of the current access point according to the value of the RQI; a site detecting module configured for receiving the RQI from the roaming adjusting module, and calculating a value of a user movement index (UMI) according to the communication environment parameters of the access points, and the beacon loss rate and the packet loss rate of the mobile terminal device, and adjusting a frequency of the mobile terminal device for scanning object access points according to the value of the UMI and the value of the RQI; a roaming determining module configured for receiving the roaming threshold from the roaming adjusting module, and determining the object access point that has satisfied a roaming threshold; and a roaming executing module configured for receiving a roaming executing command from the roaming determining module, and ending the communication between the mobile terminal device and the current access point, and establishing a communication between the mobile terminal device and the object access point a processor for executing operations for the detecting module, the roaming adjusting module, the site detecting module, the roaming determining module, and the roaming executing module of the mobile terminal device.

2. The mobile terminal device as claimed in claim 1, wherein the current communication environment parameters comprises:

a quality of service basic service set (QBSS) for each of the plurality of APs, wherein the QBSS for each of the plurality of APs represents a current channel utilization rate and a current loading of each of the plurality of APs; and a receive signal strength indication (RSSI) for each of the plurality of APs is an RSSI of the plurality of APs in the predetermined detection period, and wherein the RSSI for each of the plurality of APs represents a stability of each of the plurality of APs.

3. The mobile terminal device as claimed in claim 1, wherein the roaming frequency of the mobile terminal device is a roaming amount of the mobile terminal device in a system operation period detected by the detecting module in the predetermined detection period, and wherein the roaming frequency of the mobile terminal device indicates a communication stability between the mobile terminal device and the plurality of APs, wherein the roaming frequency increases upon the condition when the communication stability between the mobile terminal device and the plurality of APs decreases.

4. The mobile terminal device as claimed in claim 1, wherein the packet retransmission rate of the mobile terminal device is a packet retransmission amount in an audio operation period, and the packet retransmission rate of the mobile terminal device indicates a communication stability between the mobile terminal device and the current AP, wherein the packet retransmission rate increases upon the condition that the communication stability between the mobile terminal device and the current AP decreases.

5. The mobile terminal device as claimed in claim 1, wherein the value of the RQI follows the following formulas:

$$RQI = Max\_RQI - iRQI;$$

$$iRQI = (((Avg\_QBSS \div Max\_QBSS)*Max\_RQI)*0.5) + \\ (((Roam\_Freq \div Max\_Freq)*Max\_RQI)*0.2) + \\ (((Retx\_Rate \div MaxRetx\_Rate)*Max\_RQI)*0.2) + \\ (((Avg\_RSSI\_Variance \div Max\_RSSI\_Variance) \\ *Max\_RQI)*0.1);$$

where,
Max_RQI=100;
Max_QBSS=100; wherein
Max_RQI is the maximum value of the RQI;
Max_QBSS is the maximum value of the QBSS;
Avg_QBSS is the average value of the QBSS;
Max_Freq is the maximum roaming amount of the mobile terminal device;
Roam_Freq is current roaming amount of the mobile terminal device;
Max_Retx_Rate is the maximum packet retransmission rate of the mobile terminal device;
Retx_Rate is the current packet retransmission rate of the mobile terminal device;
Max_RSSI_Variance is the maximum RSSI variance of the access points; and
Avg_RSSI_Variance is the average RSSI variance of the access points.

6. The mobile terminal device as claimed in claim 5, wherein different values of the RQI represent different communication environment status, and the different communication environment status comprises a normal status, a high traffic status, and an interference status.

7. The mobile terminal device as claimed in claim 6, wherein the communication environment status of the current AP is in the normal status and communication quality is normal upon the condition that the value of the RQI is not less than a first threshold; the communication environment status of the current AP is in the high traffic status and the communication quality is bad upon the condition that the value of the RQI is between a second threshold and the first threshold; the communication environment status of the current AP is in the interference status and the communication quality is worse upon the condition that the value of the RQI is less than the second threshold; wherein the first threshold is greater than the second threshold.

8. The mobile terminal device as claimed in claim 1, wherein the roaming threshold comprises differences of the RSSI and the QBSS respectively between the destination AP and the current AP.

9. The mobile terminal device as claimed in claim 1, wherein different values of the UMI represent different user movement status, and the different user movement status comprises a static status, a walk status, and a run status.

10. The mobile terminal device as claimed in claim 9, wherein the frequency of the mobile terminal device for scanning object AP can be lowered upon the condition that the user movement status is in the static status and the value of the RQI is in the normal status and communication quality is stable; the frequency of the mobile terminal device for scanning object access points can be set to a medium rate upon the condition that the user movement status is in the walk status and the communication quality weakens slowly; the frequency of the mobile terminal device for scanning object access points can be set to a high rate, which scans the object access point quickly, upon the condition that the user movement status is in the run status and the communication quality drops down to a very low value in a short time.

11. A roaming method for a mobile terminal device roaming from a current access point (AP) to an object AP within a plurality of APs, the method comprising: detecting current communication environment parameters of each of a plurality of access points, and a roaming frequency and a packet retransmission rate of the mobile terminal device in a predetermined detection period; sending the current communication environment parameters of each of a plurality of access points, and the roaming frequency and the packet retransmission rate of the mobile terminal device to a roaming adjusting module, a site detecting module, and a roaming determining module; calculating a value of a radio quality index (RQI) according to the communication environment parameters of each of the plurality of access points, and the roaming frequency and the packet retransmission rate of the mobile terminal device, and adjusting a roaming threshold of the access points according to the value of the RQI and sending the value of the RQI to the site detecting module; receiving the value of the RQI from the roaming adjusting module and calculating a value of a user movement index (UMI) according to the communication environment parameters of each of the plurality of access points, and a beacon loss rate and a packet loss rate of the mobile terminal device, and adjusting a frequency of the mobile terminal device for scanning object access points according to the value of the UMI and the value of the RQI; determining an object access point that has satisfied a roaming threshold; and receiving a roaming executing command from the roaming determining module, and ending the communication between the mobile terminal device and the current access point, and establishing a communication between the mobile terminal device and the object access point storing collected data of the detecting module, the roaming adjusting module, the site detecting module, the roaming determining module, the roaming executing module of the mobile terminal device into a memory system.

12. The method as claimed in claim 11, wherein the current communication environment parameters comprises:
a quality of service basic service set (QBSS) for each of the plurality of APs, wherein the QBSS for each of the plurality of APs represents a current channel utilization rate and a current loading of each of the plurality of APs; and a receive signal strength indication (RSSI) variance for each of the plurality of APs is an RSSI variance of the plurality of APs in the predetermined detection period, and wherein the RSSI for each of the plurality of APs represents a stability of each of the plurality of APs.

13. The method as claimed in claim 11, wherein the roaming frequency of the mobile terminal device is a roaming amount of the mobile terminal device in a system operation period detected by the detecting module in the predetermined detection period, and wherein the roaming frequency of the mobile terminal device indicates a communication stability between the mobile terminal device and the plurality of APs, wherein the roaming frequency increases upon the condition when the communication stability between the mobile terminal device and the plurality of APs decreases.

14. The method as claimed in claim 11, wherein the packet retransmission rate of the mobile terminal device is a packet retransmission amount in an audio operation period, and the packet retransmission rate of the mobile terminal device indicates a communication stability between the mobile terminal device and the current AP, wherein the packet retransmission rate increases upon the condition that the communication stability between the mobile terminal device and the current AP decreases.

15. The method as claimed in claim 11, wherein the value of the RQI follows the following formulas:

$$RQI = Max\_RQI - iRQI;$$

$$iRQI = (((Avg\_QBSS \div Max\_QBSS)*Max\_RQI)*0.5) + \\ (((Roam\_Freq \div Max\_Freq)*Max\_RQI)*0.2) + \\ (((Retx\_Rate \div MaxRetx\_Rate)*Max\_RQI)*0.2) + \\ (((Avg\_RSSI\_Variance \div Max\_RSSI\_Variance) \\ *Max\_RQI)*0.1);$$

where, Max_RQI=100;
Max_QBSS=100; wherein
Max_RQI is the maximum value of the RQI;
Max_QBSS is the maximum value of the QBSS;
Avg_QBSS is the average value of the QBSS;
Max_Freq is the maximum roaming amount of the mobile terminal device;
Roam_Freq is current roaming amount of the mobile terminal device;
Max_Retx_Rate is the maximum packet retransmission rate of the mobile terminal device;
Retx_Rate is the current packet retransmission rate of the mobile terminal device;
Max_RSSI_Variance is the maximum RSSI variance of the access points; and
Avg_RSSI_Variance is the average RSSI variance of the access points.

16. The method as claimed in claim 15, wherein different values of the RQI represent different communication environment status, and the different communication environment status comprises a normal status, a high traffic status, and an interference status.

17. The method as claimed in claim 16, wherein the communication environment status of the current AP is in the normal status and communication quality is normal upon the condition that the value of the RQI is not less than a first threshold; the communication environment status of the current AP is in the high traffic status and the communication quality is bad upon the condition that the value of the RQI is between a second threshold and the first threshold; the communication environment status of the current AP is in the interference status and the communication quality is worse upon the condition that the value of the RQI is less than the second threshold; wherein the first threshold is greater than the second threshold.

18. The method as claimed in claim 11, wherein the roaming threshold comprises differences of the RSSI and the QBSS respectively between the destination AP and the current AP.

19. The method as claimed in claim 11, wherein different values of the UMI represent different user movement status, and the different user movement status comprises a static status, a walk status, and a run status.

20. The method as claimed in claim 19, wherein the frequency of the mobile terminal device for scanning object AP can be lowered upon the condition that the user movement status is in the static status and the value of the RQI is in the normal status and the communication quality is stable; the frequency of the mobile terminal device for scanning object access points can be set to a medium rate upon the condition that the user movement status is in the walk status and the communication quality weakens slowly; the frequency of the mobile terminal device for scanning object access points can be set to a high rate, which scans the object access point quickly, upon the condition that the user movement status is in the run status and the communication quality drops down to a very low value in a short time.

* * * * *